US011883946B2

(12) United States Patent
La Vardera

(10) Patent No.: US 11,883,946 B2
(45) Date of Patent: Jan. 30, 2024

(54) HANDHELD DEVICE CONFIGURED TO TRANSPORT, ORGANIZE, AND/OR STORE ONE OR MORE TOOLS, AND METHOD OF USING SAME

(71) Applicant: Gregory La Vardera, Merchantville, NJ (US)

(72) Inventor: Gregory La Vardera, Merchantville, NJ (US)

( * ) Notice: Subject to any disclaimer, the term of this patent is extended or adjusted under 35 U.S.C. 154(b) by 74 days.

(21) Appl. No.: 17/649,689

(22) Filed: Feb. 2, 2022

(65) Prior Publication Data

US 2022/0355464 A1 Nov. 10, 2022

Related U.S. Application Data

(60) Provisional application No. 63/184,784, filed on May 6, 2021.

(51) Int. Cl.
*B25H 3/04* (2006.01)
*B25H 3/00* (2006.01)

(52) U.S. Cl.
CPC ............... *B25H 3/04* (2013.01); *B25H 3/003* (2013.01); *B25H 3/006* (2013.01)

(58) Field of Classification Search
CPC ........... B25H 3/04; B25H 3/003; B25H 3/006
See application file for complete search history.

(56) References Cited

U.S. PATENT DOCUMENTS 4,337,860 A * 7/1982 Carrigan ................ B25H 3/003 211/49.1
4,717,106 A * 1/1988 Bies ....................... B65D 73/00 248/309.2
5,190,154 A * 3/1993 Reusch .................. B25H 3/003 206/375
5,467,874 A * 11/1995 Whitaker ................. B25H 3/06 248/309.2
5,715,951 A * 2/1998 Dembicks ............... B25B 13/56 206/378

(Continued)

FOREIGN PATENT DOCUMENTS

CA 2413204 A1 * 11/2003 ............. B25H 3/003
DE 202017107099 U1 * 3/2018

(Continued)

*Primary Examiner* — Stanton L Krycinski
(74) *Attorney, Agent, or Firm* — Mark T. Vogelbacker; Eckert Seamans Cherin & Mellott, LLC

(57) ABSTRACT

A handheld device configured to transport or store tools can include a back plate having a planar rear surface and an opposing front surface. A top wall can extend outwardly from a first end of the rear surface in a first direction. The top wall can have an interior surface and an opposing exterior surface. A bottom wall can extend outwardly from a second end of the rear surface in the first direction. A handle can extend outwardly from the exterior surface of the top wall in a second direction. The second direction is perpendicular to the first direction. At least two spaced-apart mounting points can each extend outwardly from the front surface in the first direction. Each mounting point can be configured to be inserted into a receptacle of at least one of the tools to attach the at least one of the tools to the handheld device.

20 Claims, 13 Drawing Sheets

(56) References Cited

U.S. PATENT DOCUMENTS

| | | | | | |
|---|---|---|---|---|---|
| 5,855,285 | A * | 1/1999 | Laird | B25H 3/003 206/378 |
| 6,050,409 | A * | 4/2000 | Delbeck | B25H 3/003 206/375 |
| 6,079,559 | A * | 6/2000 | Lee | A47F 5/0006 206/443 |
| 6,098,799 | A * | 8/2000 | Lee | B65D 85/20 206/378 |
| 6,415,933 | B1 * | 7/2002 | Kao | B65D 73/0064 206/378 |
| 6,488,151 | B2 * | 12/2002 | Ramsey | B25H 3/06 206/378 |
| 6,644,474 | B1 * | 11/2003 | Lai | B25H 3/003 206/378 |
| 6,669,032 | B2 * | 12/2003 | Kao | B25H 3/003 206/378 |
| 6,854,607 | B2 * | 2/2005 | Tong | B25H 3/003 206/378 |
| 7,066,339 | B2 * | 6/2006 | Chiu | A47F 5/0807 211/183 |
| 7,210,578 | B2 * | 5/2007 | Tuan-Mu | B25H 3/003 206/378 |
| 7,360,654 | B2 * | 4/2008 | Liu | B25G 1/085 206/754 |
| 7,735,645 | B2 * | 6/2010 | Joyce | B25H 3/04 211/DIG. 1 |
| 8,205,758 | B2 * | 6/2012 | Shih | B25H 3/003 206/378 |
| 8,261,910 | B2 * | 9/2012 | Guenter | A61C 8/0087 206/363 |
| 8,307,980 | B1 * | 11/2012 | Kao | B25H 3/04 206/378 |
| 8,381,905 | B1 * | 2/2013 | Kao | B25H 3/003 206/378 |
| 8,800,767 | B2 * | 8/2014 | Wang | B25H 3/00 206/378 |
| 9,138,890 | B2 * | 9/2015 | Lee | B25H 3/003 |
| 9,572,437 | B1 * | 2/2017 | Ou | B25H 3/003 |
| 9,718,183 | B2 * | 8/2017 | Ou | B25H 3/04 |
| 9,782,890 | B2 * | 10/2017 | Hsieh | B25H 3/04 |
| 10,130,194 | B1 * | 11/2018 | Lai | B25H 3/04 |
| 10,272,547 | B1 * | 4/2019 | Lai | B25B 13/06 |
| 10,279,467 | B2 * | 5/2019 | Ou | B25H 3/04 |
| 10,485,345 | B2 * | 11/2019 | Bishop | B25H 5/00 |
| 10,737,858 | B1 * | 8/2020 | Hsu | B65D 73/0064 |
| 10,960,532 | B2 * | 3/2021 | Billups, Jr. | G01C 9/32 |
| 11,091,778 | B2 * | 8/2021 | Winnard | A61K 39/12 |
| 2003/0141211 | A1 * | 7/2003 | Tsai | B25H 3/003 206/378 |
| 2003/0213760 | A1 * | 11/2003 | Lee | B25H 3/003 206/378 |
| 2005/0247587 | A1 * | 11/2005 | Holland-Letz | B25H 3/003 206/349 |
| 2010/0122926 | A1 * | 5/2010 | Tocco | B23B 31/1071 29/700 |
| 2010/0170817 | A1 * | 7/2010 | Wu | B25H 3/04 206/378 |
| 2015/0367503 | A1 * | 12/2015 | Liu | B25H 3/003 206/377 |
| 2017/0066123 | A1 * | 3/2017 | Shih | B25H 3/003 |
| 2017/0144295 | A1 * | 5/2017 | Ou | B25H 3/003 |
| 2019/0283233 | A1 * | 9/2019 | Kukucka | B25H 3/06 |
| 2020/0384631 | A1 * | 12/2020 | Reed | B25H 3/04 |
| 2021/0122028 | A1 * | 4/2021 | Hernandez, Jr. | B25H 3/06 |
| 2021/0220859 | A1 * | 7/2021 | Keutzer | B25H 3/06 |
| 2021/0260746 | A1 * | 8/2021 | Anderson | B25H 3/003 |
| 2023/0158660 | A1 * | 5/2023 | Schneider | B25H 3/04 211/70.6 |

FOREIGN PATENT DOCUMENTS

| | | | | |
|---|---|---|---|---|
| DE | 102017104686 | A1 * | 9/2018 | |
| DE | 202019101869 | U1 * | 6/2019 | |
| DE | 102019000594 | A1 * | 7/2020 | |
| WO | WO-2021001696 | A1 * | 1/2021 | B25H 3/003 |

* cited by examiner

HANDHELD DEVICE CONFIGURED TO TRANSPORT, ORGANIZE, AND/OR STORE ONE OR MORE TOOLS, AND METHOD OF USING SAME

CROSS-REFERENCE TO RELATED APPLICATION

The present application claims priority to U.S. Provisional Patent Application No. 63/184,784, filed May 6, 2021 and titled "DEVICE FOR THE STORAGE & TRANSPORT OF INTERCHANGEABLE DRILL CHUCKS OF MULT-HEADED INSTALLATION DRILL-DRIVER POWER TOOLS", the disclosure of which is hereby incorporated by reference.

FIELD

The presently disclosed technology relates generally to transporting (e.g., carrying), organizing, and/or storing one or more objects, such as but not limited to tools by a craftsman in, to, and/or from a workshop or work site. More specifically, in one embodiment, the presently disclosed technology relates to storing, organizing, and/or transporting drill chucks from a specific class of installation drills that have multiple interchangeable chucks for drilling and screw driving.

BACKGROUND AND DESCRIPTION OF RELATED ART

It can be challenging to transport, organize, and store numerous components in a set, especially when the components are relatively heavy, difficult to hold more than one in a user's hand, valuable, and/or fragile. This problem extends across many fields and industries.

One example of where this problem is prevalent is in the power tool art. Multi-head power drills, such as the 18 v or 12 v variety, are well known. In recent years, specialty installation drill-drivers have grown in popularity. As a result, several tool manufacturers, such as MILWAUKEE™, BOSCH™, DEWALT™, HILTI™, METABO™, FESTOOL™, and FEIN™, have introduced multi-headed drills with interchangeable chucks.

Typically, prior art drill chucks are one of four kinds: a Jacobs style chuck for drill bits, a ¼" hex quick-release screw driver bit chuck, an off-set screwdriver bit chuck that enables access close to adjacent surfaces, and a right-angle adapter chuck that allows drilling and screwing at 90 degrees to the axis of the drill. These chucks tend to be relatively expensive, and most craftsman would prefer not to buy more than one set.

BRIEF SUMMARY

Despite the popularity of and the numerous benefits of multi-head power tools, tool makers do not provide a reliable and efficient way to transport, organize, and/or store the chucks. Sometimes, the drills are sold with a storage bag, but often artisans or craftsmen do not utilize these bags because they will transport the drill in a larger bag as part of a bigger group of tools used for various tasks. Further, the drill and chucks, once separated from their original packaging, are prone to being lost or hidden under other tools in the bottom of a tool bag.

The presently disclosed technology overcomes the above and other drawbacks of the prior art in both the power tool and other arts.

In one optional embodiment, the presently disclosed technology is directed to a device designed to keep loose chucks together in an organized manner, so that the chucks be easily stored in a larger tool bag, and/or so the chucks can be kept together on a crowded workbench, all located quickly, and prevented from being lost on the bench or in a tool bag. Optionally, the device of the presently disclosed technology augments the drill by organizing and enabling the craftsman to partake in the drill's main utility—its interchangeable chucks.

In another optional embodiment, the presently disclosed technology is directed to a device configured to provide a single storage location for loose chucks. Once gathered and attached to the device, the chucks can be stored or transported as a single unit, preventing individual chucks from being lost or misplaced. The device can include a body with multiple mounting points for the interchangeable chucks. The body of the device can allow the device to be positioned in several orientations, such as vertically, on its back, and/or on its side, which allows flexibility in how the device is used and stored. The body can also optionally include a handle for carrying or hanging the device. In addition, the body can provide protection to the chucks should the device be accidentally dropped.

In yet another optional embodiment, the presently disclosed technology is directed to a handheld device configured to transport and/or store tools that can include a back plate having a planar rear surface and an opposing front surface. A top wall can extend outwardly from a first end of the rear surface in a first direction. The top wall can have an interior surface and an opposing exterior surface. A bottom wall can extend outwardly from a second end of the rear surface in the first direction. A handle can extend outwardly from the exterior surface of the top wall in a second direction. The second direction is perpendicular to the first direction. At least two spaced-apart mounting points can each extend outwardly from the front surface in the first direction. Each mounting point can be configured to be inserted into a receptacle of at least one of the tools to attach at least one of the tools to the handheld device.

In still a further optional embodiment, the presently disclosed technology is directed to a combination including a power tool, one or more tools, and a handheld device to transport, organize, and/or store the tools.

BRIEF DESCRIPTION OF THE DRAWINGS

The foregoing summary, as well as the following detailed description of the presently disclosed technology, will be better understood when read in conjunction with the appended drawings, wherein like numerals designate like elements throughout. For the purpose of illustrating the presently disclosed technology, there are shown in the drawings various illustrative embodiments. It should be understood, however, that the presently disclosed technology is not limited to the precise arrangements and instrumentalities shown. In the drawings.

DETAILED DESCRIPTION

Figure 1:
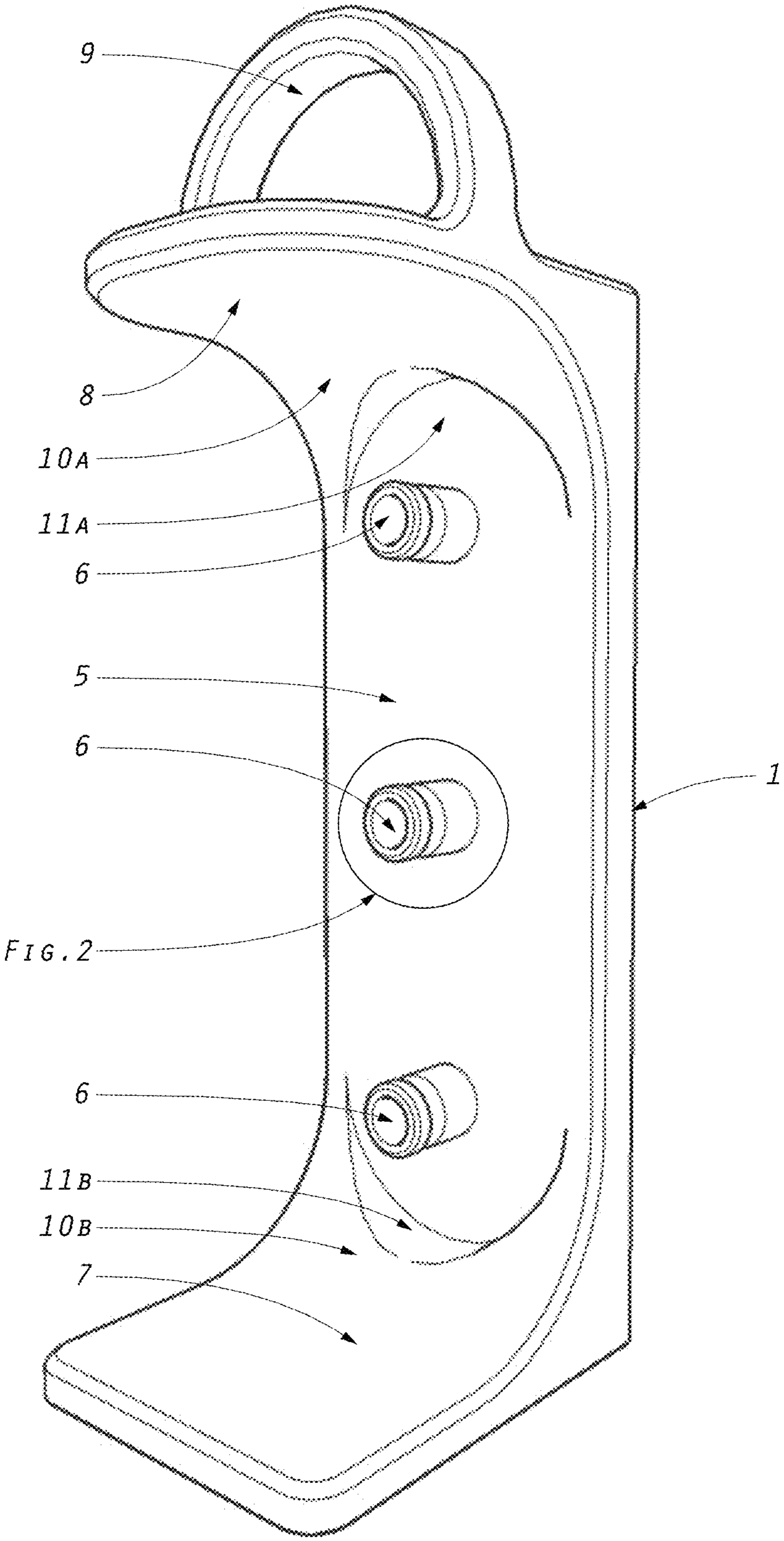
FIG. 1 is a perspective view of a device according to an embodiment of the presently disclosed technology, wherein the device is shown in a first orientation.
Figure 2:
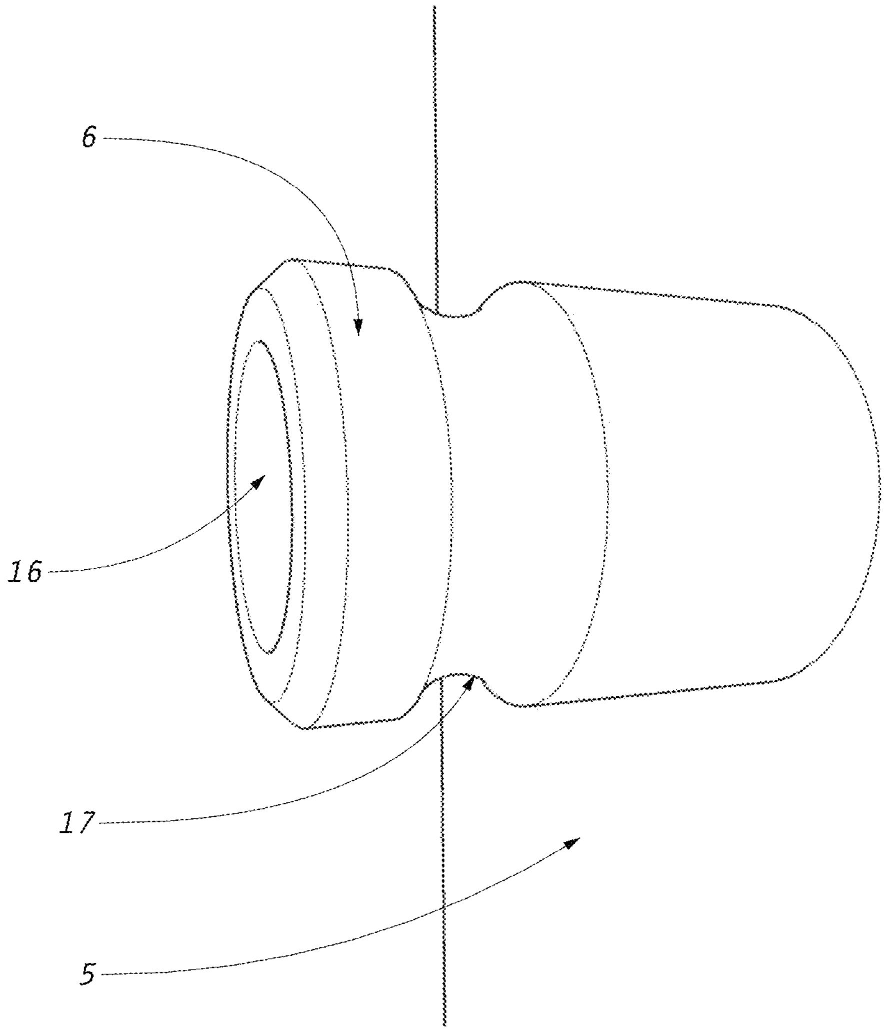
FIG. 2 is a magnified view of a portion of the device as identified by the label "FIG. 2" in FIG. 1.
Figure 3:
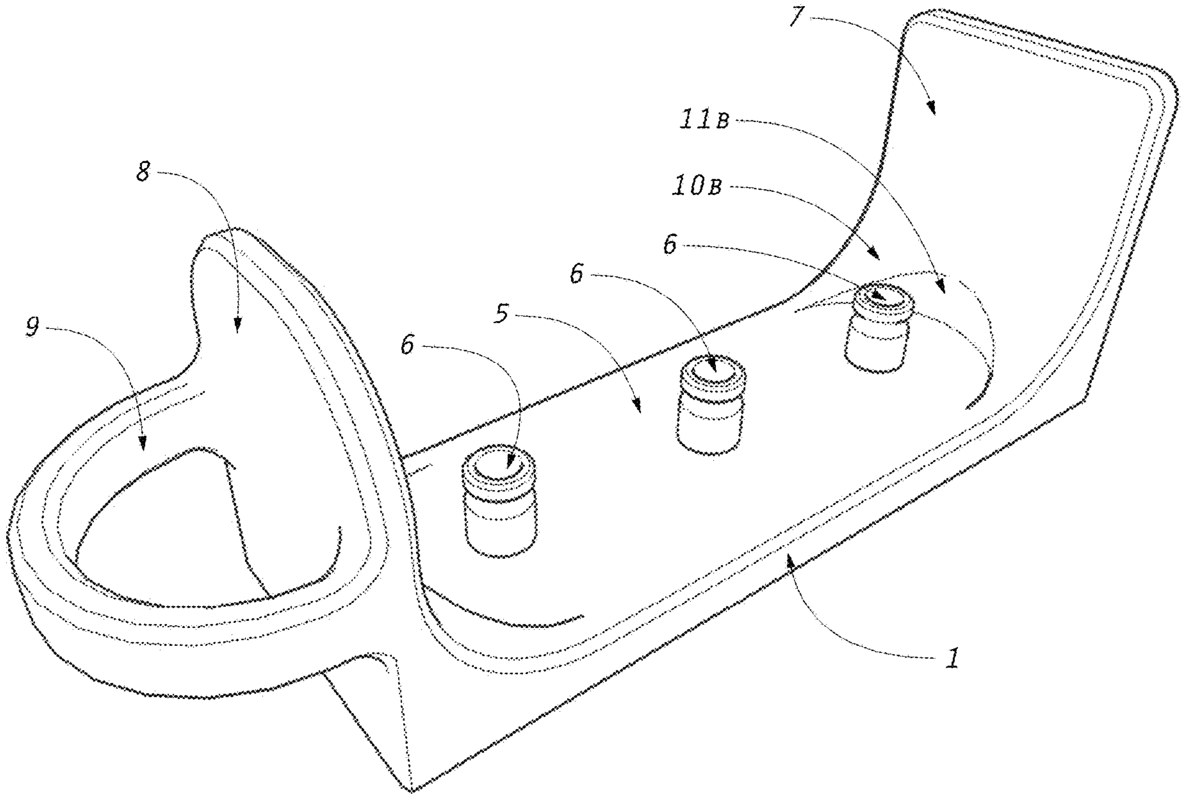
FIG. 3 is another perspective view of the device shown in FIG. 1, wherein the device is shown in a second orientation.
Figure 4:
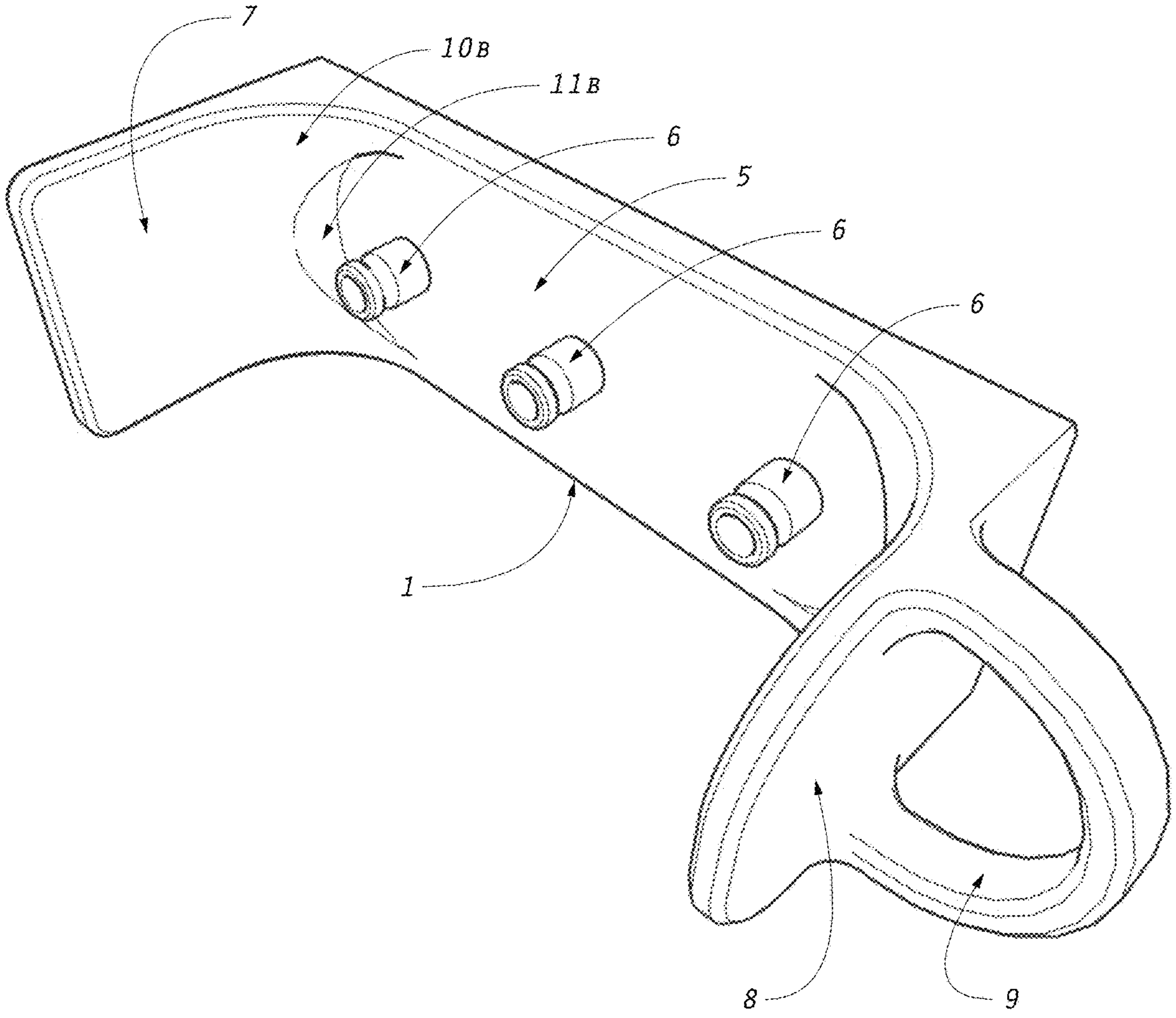
FIG. 4 is yet another perspective view of the device shown in FIG. 1, wherein the device is shown in a third orientation.

While systems, devices and methods are described herein by way of examples and embodiments, those skilled in the art recognize that the presently disclosed technology is not limited to the embodiments or drawings described. Rather, the presently disclosed technology covers all modifications, equivalents and alternatives falling within the spirit and scope of the appended claims. Features of any one embodiment disclosed herein can be omitted or incorporated into another embodiment.

Any headings used herein are for organizational purposes only and are not meant to limit the scope of the description or the claims. As used herein, the word "may" is used in a permissive sense (i.e., meaning having the potential to) rather than the mandatory sense (i.e., meaning must). Unless specifically set forth herein, the terms "a," "an" and "the" are not limited to one element but instead should be read as meaning "at least one." The terminology includes the words noted above, derivatives thereof and words of similar import.

Referring now in detail to the figures, wherein like reference numerals refer to like parts throughout, FIGS. 1-7 show a handheld device, generally designated 1, configured to transport, organize, and/or store one, two, or more tools, generally designated 14. The device 1 can also be configured to protect the tools 14 from breaking, scratches, dents, and/or misplacement. The device 1 can be configured to lay stable on a flat surface in one, two, or each of a vertical configuration (FIG. 1), a side configuration (FIG. 4), and a back configuration (FIG. 3), wherein each configuration is rotated 90 degrees from the other configurations.

The tool(s) 14 shown and described herein are drill chucks having different sizes, shapes, configurations, and/or uses. The drill chucks can each be removably attachable to a power drill 15 (see FIG. 7), for example. However, the tool(s) 14 are not limited to being drill chucks, as the tool(s) 14 can be any object that would benefit from the presently disclosed technology. For example, the tool(s) 14 can be any object that relies on an interchangeable mechanism and/or uses a common (e.g., drive) chassis, such as but not limited to solder-less plumbing press tools and electrical terminal crimpers, which have different sized dies for different diameter pipes or electrical cables. Another example of the tool(s) can be any of the attachments to a cooking appliance (e.g., KITCHEN AID™ mixer having several different rotating mixer attachments), food processor, blender, or cocktail mixer.

The device 1 can include a body having a back plate 5 with an entirely planar rear surface and an opposing front surface. A top wall 8 can extend outwardly from a first end of the back plate 5 in a first direction D1. The top wall 8 can have an interior surface and an opposing exterior surface. A bottom wall 7 can extend outwardly from a second end of the back plate 5 in the first direction D1. The bottom wall 7 can have an interior surface and an opposing exterior surface that is optionally entirely planar. Optionally, the top wall 8 can extend parallel to the bottom wall 7.

In one embodiment, a handle 9 can extend outwardly from the exterior surface of the top wall 8 in a second direction D2. The second direction D2 can be perpendicular to the first direction D1. The handle 9 can optionally be configured to allow the device 1 to be carried by or attached to a bag or a belt with a carabineer or other type of hook or attachment.

In one embodiment, the handle 9 can have arcuate or arch shape with opposing ends attached to the exterior surface of the top wall 8. This location can be beneficial because handle 9 allows a user to quickly and efficiently carry the device and reconfigure the positioning of the device 1, without the handle 9 being an obstruction. Optionally, the handle 9 can be integrally attached to the exterior surface of the top wall 8. In one embodiment, the handle 9 can be welded to the exterior surface of the top wall 8. The handle 9 can optionally be located in other positions or locations, depending upon the needs of the user.

In one embodiment, one, two, three, or more spaced-apart mounting points 6 can each extend outwardly from the front surface of the back plate 5 in the first direction D1. Each mounting point 6 can be configured to be inserted into a receptacle of at least one of the tools 14 to attach at least one of the tools 14 to the device 1. Optionally, the mounting points 6 are arranged in a linear fashion along the front surface of the back plate 5 and spaced inwardly from each side edge of the back plate 5.

Figure 5:
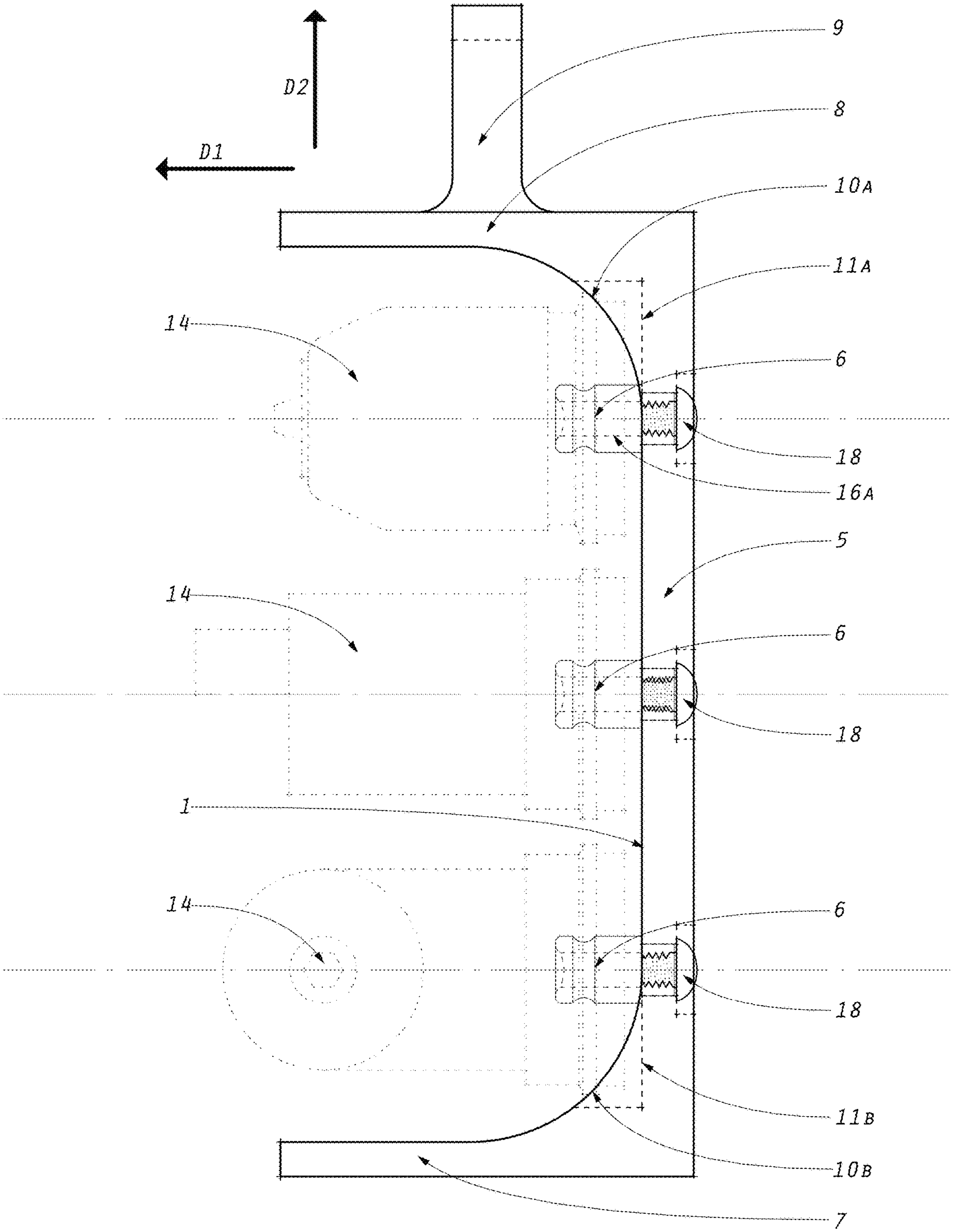
FIG. 5 is a side, cross-sectional, elevation view of the device shown in FIG. 1, wherein tools are shown in broken lines for clarity.
Figure 6:
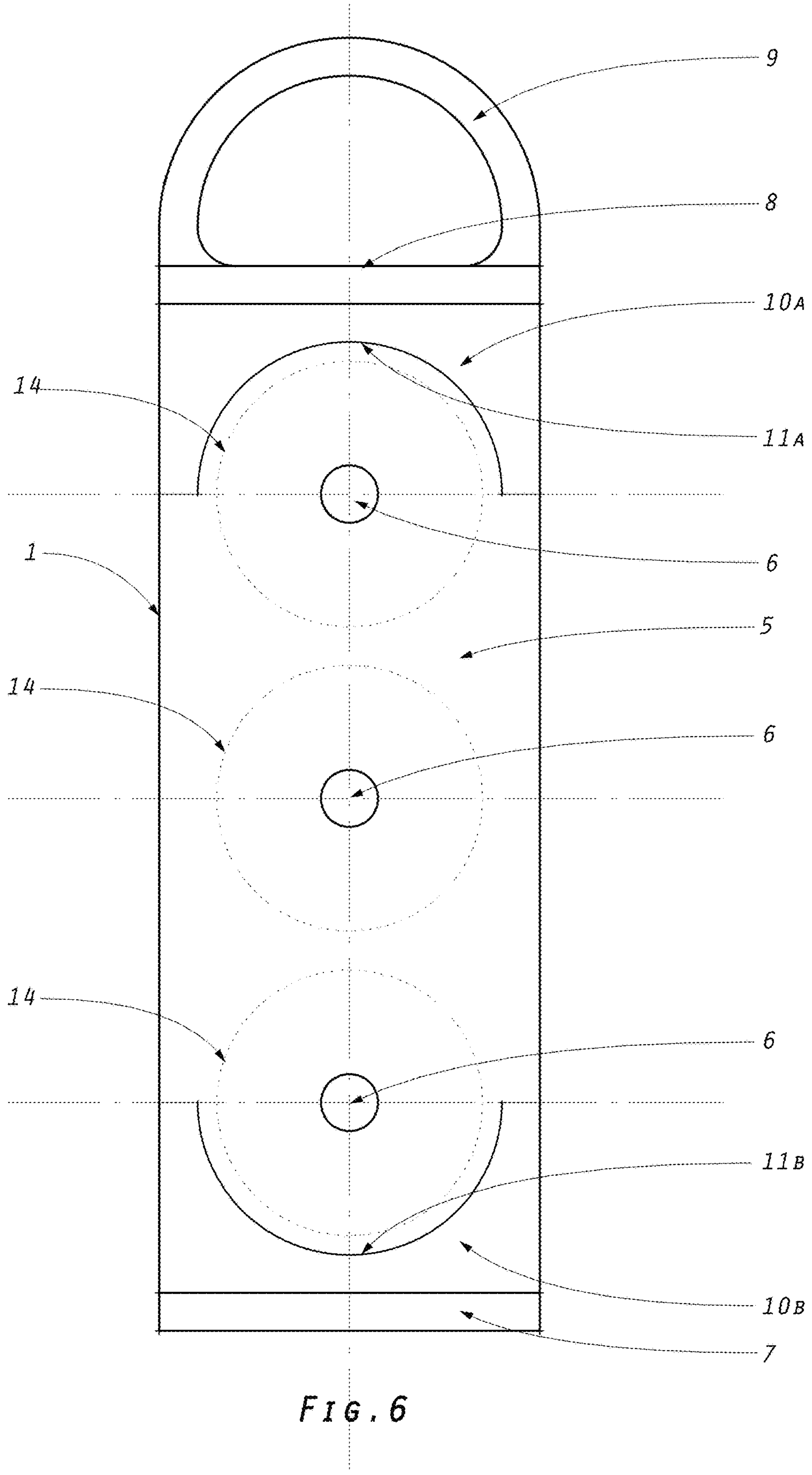
FIG. 6 is a front elevation view of the device shown in FIG. 1, wherein tools are shown in broken lines for clarity.
Figure 7:
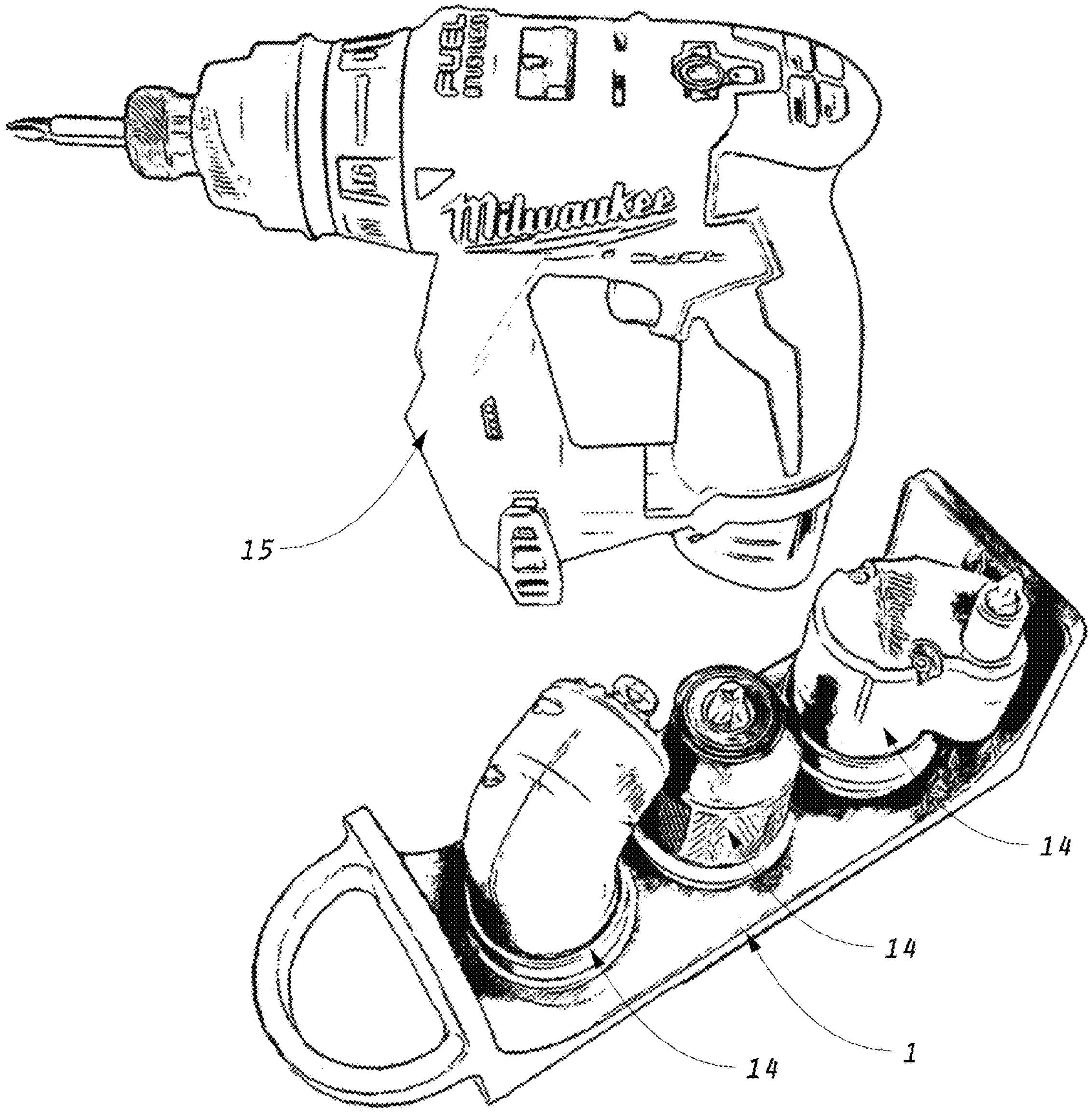
FIG. 7 is a perspective view of a drill and the device shown in FIG. 1 holding tools.
Figure 8:
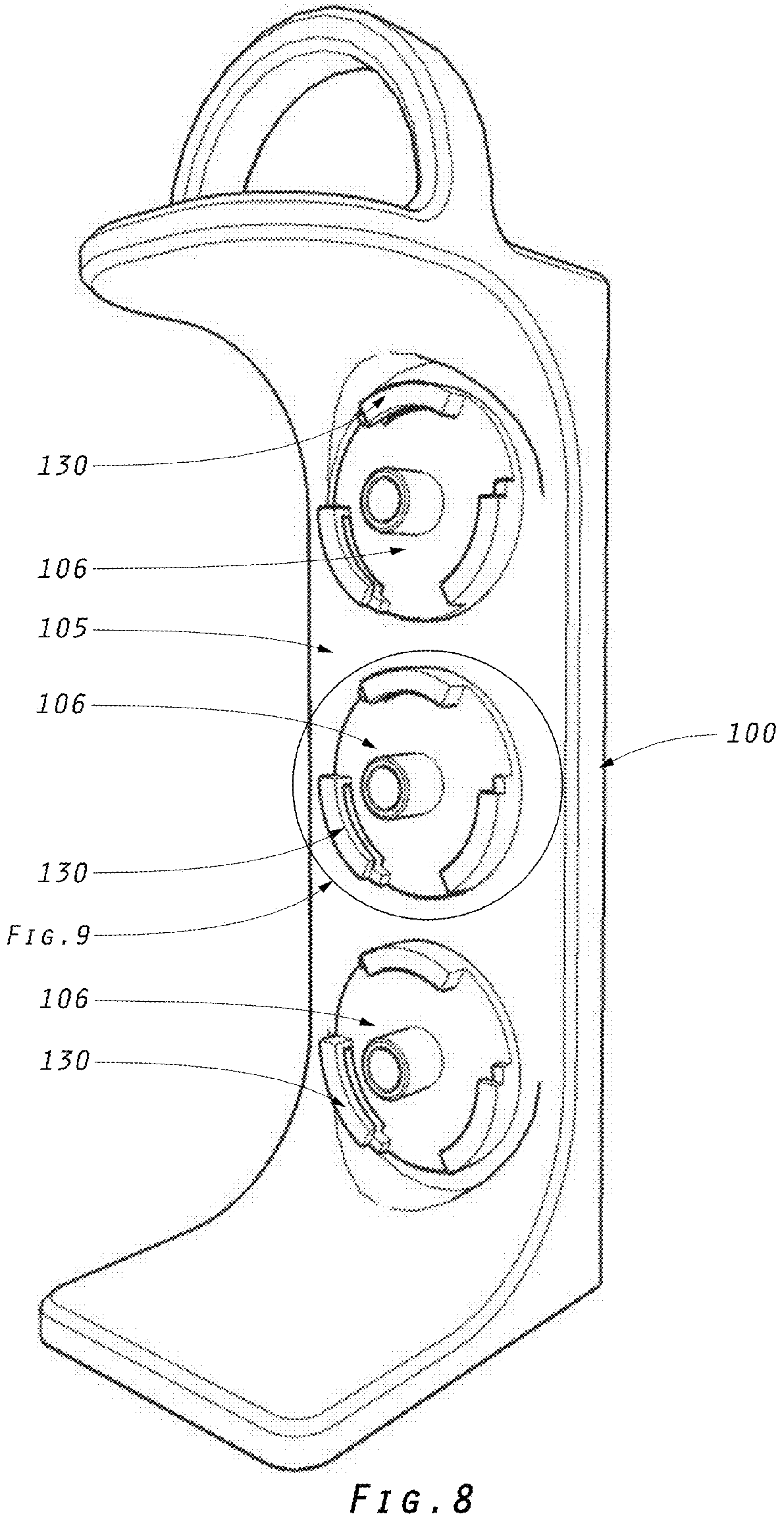
FIG. 8 is a perspective view of a device according to another embodiment of the presently disclosed technology.

The mounting points 6 are optionally sufficiently spaced-apart so that each mounting point 6 is configured to attach to one of the tools 14. In one embodiment, as shown in FIGS. 5 and 6, when the tools 14 are in a particular or at least one orientation and attached to the device, the tools 14 do not contact each other. However, in one or more other orientations of one or each of the tools 14 (e.g., a rotated orientation), the size, shape, and/or configuration of one or more of the tools 14 is such that they may contact an adjacent tool 14. Generally, any contact between the tools 14 is not a concern as they cannot build up enough momentum to damage each other with normal handling. As a result, the spacing of the mounting points 6 allows for mounting and/or dismounting of one or more of the tools 14 without interfering with each other or preventing access thereto.

Different brands of drills or other power tools use differently configured interfaces for attaching the chucks. Optionally, the mounting points 6 of the device 1 are configured to mimic the mounting interfaces of the drill or other power tools. The mounting points 6 optionally do not need to replicate the power-transmission functions of the actual drill mounts. The device 1 can optionally be configured such that the mounting points 6 are interchangeable (e.g., removable) so that one casting or molding of the body of the device 1 can accommodate any of the different brand style mounting points.

Optionally, as shown in FIG. 1, each mounting point 6 can include a projection or shaft. The projection can extend in the first direction away from the front surface of the back plate 5. Optionally, each projection can have a cylindrical exterior shape and an opening 16 at a free or exposed end thereof that leads to a passageway 16A. The opening 16 can be part of a dimple or conical area at or near the free end of the projection. The passageway 16A can optionally be almost as long or deep as the projection is long. The opening 16 can have a diameter that is at least slightly larger than a diameter of a drive shaft of one of the tools 14, such that the drive shaft of the tool can extend into the passageway.

A continuous groove 17 can optionally extend around an entire periphery of the projection. The groove 17 can be spaced-apart inwardly from the opening 16 or free end of the projection toward the front surface of the back plate 5. The mounting point(s) 6 is/are not limited to the specific size, shape, and/or configuration described above or shown herein. Instead, each mounting point 6 can be sized, shaped, and/configured to complement the tool(s) 14 or other object(s) to which it is intended to attach or hold.

Referring to FIG. 5, each mounting point 6 can optionally be attached to the back plate 5 by a fastener 18, for example. One example of a fastener 18 that can be utilized is a screw, as shown in FIG. 5. Each fastener 18 can extend into and/or through an opening in the back plate 5 such that it can be received in a portion (e.g., a threaded slot or passageway) of a mounting point 6. Thus, each mounting point 6 can optionally be removably attached to the back plate 5 and/or the device 1, such as for easy replacement of a mounting point 6 or for a brand change of the tool(s) 14.

Optionally, the end of each mounting point 6 that is designed to be inserted into one of the openings in the back plate 5 can have a reduced diameter that is approximately the same diameter as the respective opening in the back plate 5. The remaining portion of each mounting point 6, aside from the groove 17, can have a larger diameter that cannot be inserted into one of the openings in the back plate 5.

The combination of the fastener 18, the back plate 5, and the mounting point 6 can combine to hold the respective tool 14 firmly in place, to prevent the tool 14 from moving and contacting another tool 14 or separating from the device 1. In one embodiment, each fastener 18 extends perpendicularly to the planar rear surface of the back plate 5 when the fastener 18 is inserted into the respective opening in the back plate 5 and attached to a mounting point 6.

All or a portion of each mounting point 6 can optionally be made of metal for durability. Optionally, each mounting point 6 is formed of aluminum or a soft tempered steel, which would wear preferentially over the hardened steel components of the tool, at least in one embodiment. This way, the easily replaceable mounting points 6 will wear rather than the more costly tools 14. In one embodiment, the device 1 weights between 4.0 to 6.0 ounces, and has dimensions of 8.5 inches by 3 inches by 2.5 inches. If configured to plumping press tools or electrical crimping tools, for example, the device 1 could be reconfigured to be much larger and heavier.

As shown in at least FIGS. 1, 5 and 6, a first gusset 10A can be located between or at the front surface of the back plate 5 and the interior surface of the top wall 8. The first gusset 10A can include or be formed of a curved wall configured to strengthen the device 1 by increasing the material and/or increase the protection the device 1 provides to the tool(s) 14 in the event the device 1 is inadvertently dropped or hit. The first gusset 10A optionally includes a first recess 11A therein. The first recess 11A can be configured to allow at least one of the tools 14 to be positioned closer to the top wall 8 when the tool 14 is attached to a top one of the mounting points 6, than if the first recess 11*a* was not present. Optionally, a radius of curvature of the first recess 11A mimics or is at least slightly larger than a radius of curvature of an outer periphery of one of the tools 14.

As shown in at least FIGS. 1 and 3-6, a second gusset 10B can be located between or at the front surface of the back plate 5 and an interior surface of the bottom wall 7. The second gusset 10B can include or be formed of a curved wall configured to strengthen the device 1 by increasing the material and/or increase the protection the device 1 provides to the tool(s) 14 in the event the device 1 is inadvertently dropped or hit. The second gusset 10*b* optionally includes a second recess 11B therein. The second recess 11*b* can be configured to allow the tool 14 to be positioned closer to the bottom wall 7 when the tool 14 is attached to the bottom-most mounting points 6, than if the second recess 11B was not present. Optionally, a radius of curvature of the second recess 11B mimics or is at least slightly larger than a radius of curvature of an outer periphery of one of the tools 14.

In one embodiment, the body of the device 1 can be formed of any of several materials, such as metal or metallic material. However, the device 1 can be formed of any material (e.g., plastic, a synthetic polymer, such as nylon, or polyethylene) that permits the functionality described herein. A finish carpenter would benefit from a plastic body of the device 1, which would protect delicate finishes and prevent scratches or damage in the work area. An electrician or HVAC technician working in an unfinished building would benefit from a durable metal body of the device 1, which would not break from drops or raw unfinished surfaces found on construction sites.

In one embodiment, the body of the device 1 can be formed by injection molding, in which case one or more portions of the body can include depressions or recesses, which allows the body to be formed using less material while also maintaining the desired structural integrity. In another embodiment, the body of the device 1 can be formed by 3D printing (e.g., using PETG material), in which case an enclosed cavity of the body can be hollow so as to use less material and reduce the weight of the body. Alternatively, the body of the device 1 can be machined or cast.

In operation, a user can attach one of the tools 14 to each mounting point 6. Each tool 14 can be attached to a mounting point 6 in any of a number of ways, depending upon the structure of the tool 14. For example, the tool 14 can be moved or pushed linearly toward the front surface of the back plate 5 (e.g., opposite to the first direction D1) until the mounting point 6 is fully or sufficiently inserted into a receptacle of the tool 14 such that the mounting point 6 can support the tool. Alternatively or additionally, the tool 14 can be rotated onto the mounting point 6. Alternatively or additionally, the tool 14 can be moved or pushed in two separate linear paths in series (e.g., opposite to the first direction D1 and opposite to the second direction D2).

The device 1 can be laid in the vertical configuration (FIG. 1), the side configuration (FIG. 4), and the back configuration (FIG. 3) without the tools 14 from moving with respect to each other or the respective mounting point 6. The user can manipulate or raise the device 1 by grasping the handle 9. The user can remove the tools 14 from the respective mounting point 6 by performing the opposite movement used to attach the tool 14 to the mounting point 6. As shown in FIG. 5, when attached to the device 10, a proximal end of each tool 14 can have a flat surface that extends parallel to and at least slightly spaced-apart from the front surface of the back plate 5. Alternatively, the proximal end of one or more of the tools 14 can contact the front surface of the back plate 5 when the tool 14 is attached to the device 1.

The device 1 is designed to keep the tools 14 together, for convenience of locating them quickly and to prevent misplacing one or more of the tools 14. Storing the tools 14 loose on a cluttered workbench will make it easy to lose them. Transporting the tools 14 loose in a tool bag will leave the artisan or craftsman searching the bottom of the bag for the tools 14. The device 1 makes it fast and easy to move the tools 14 from workbench to tool bag, from storage to active use, and/or back again. To that end, the device 1 can be positioned in multiple orientations, lifted by any portion of the body or handle 9, placed inside a tool bag or box, and/or hung by the handle 9 from a toolbox or workers tool belt. This versatility and flexibility makes the device 1 easy to use and adaptable to many storage and carrying situations.

In one embodiment, the device 1 can be formed or assembled as follows. First, the body of the device 1 is created through any of a variety of methods, such as injection molding or 3D printing. Next, a mounting point 6, optionally formed of a material different than the body of the device 1, is placed in each of the holes (which are either preexisting and formed at the time the body is formed, or formed shortly prior to inserting the mounting point) extending through the back plate 5 of the device 1. Then, a fastener 18 is inserted into an opening of each mounting point 6 to attach each mounting point 6 to the back plate 5. Finally, a tool 14 can be attached to each mounting point 6.

FIGS. 8-12 show another embodiment of the handheld device, generally designated 100, of the presently disclosed technology. Similar or identical structure as between the embodiment of FIGS. 1-7 and the embodiment of FIGS. 8-12 is distinguished in FIGS. 8-12 by a reference number with a magnitude one hundred (100) greater than that of FIGS. 1-7. Description of certain similarities between the embodiment of FIGS. 1-7 and the embodiment of FIGS. 8-12 may be omitted herein for convenience and brevity only.

One distinction of the embodiment of FIGS. 8-12 is that each mounting point 106 can include one, two, three or more spaced-apart guards 130. Each guard 130 can be radially spaced-apart from the cylindrical projection of the mounting point 106. Each guard 130 can extend outwardly from the front surface of the back plate 105 in the first direction. Each guard 130 can be configured to complement and/or matingly engage a portion of one of the tools 114 when the tool 114, which can be removably attached to power equipment 115, is attached to the device 100.

Figure 9:
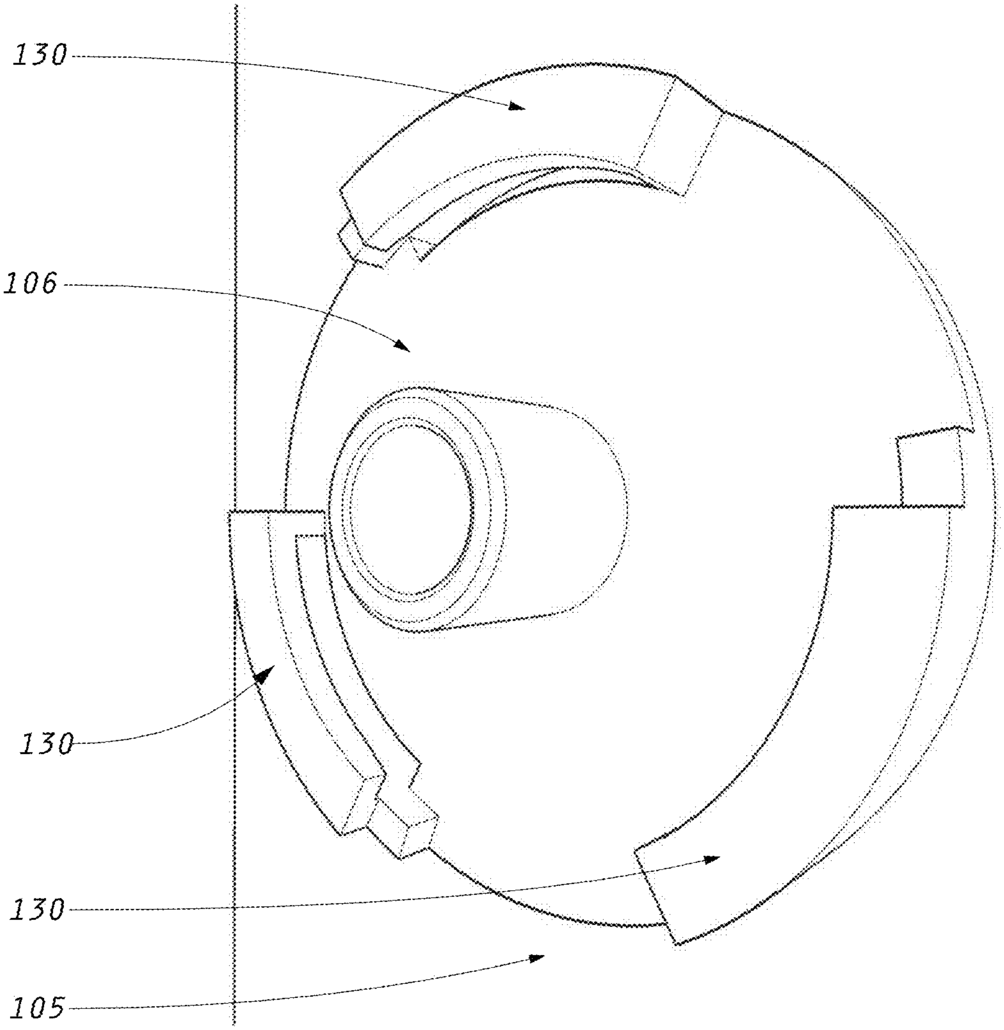
FIG. 9 is a magnified view of a portion of the device as identified by the label "FIG. 9" in FIG. 8.
Figure 10:
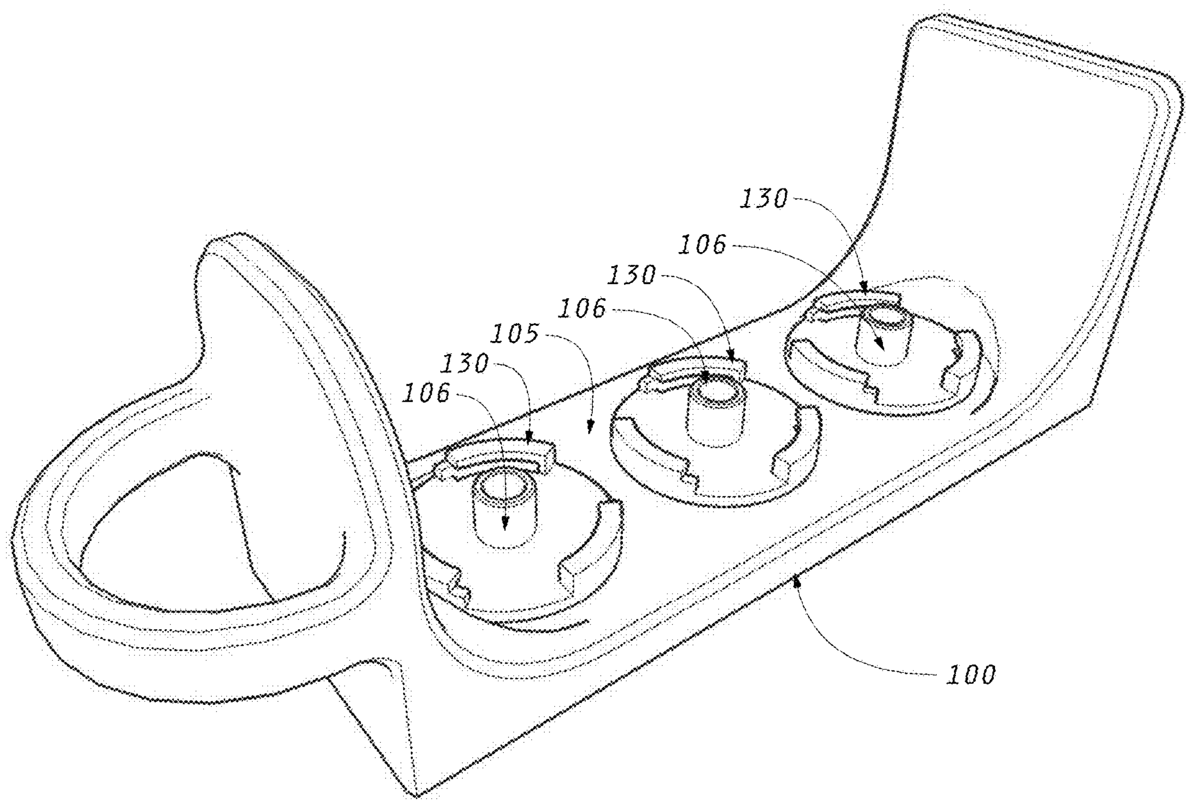
FIG. 10 is another perspective view of the device shown in FIG. 8.
Figure 11:
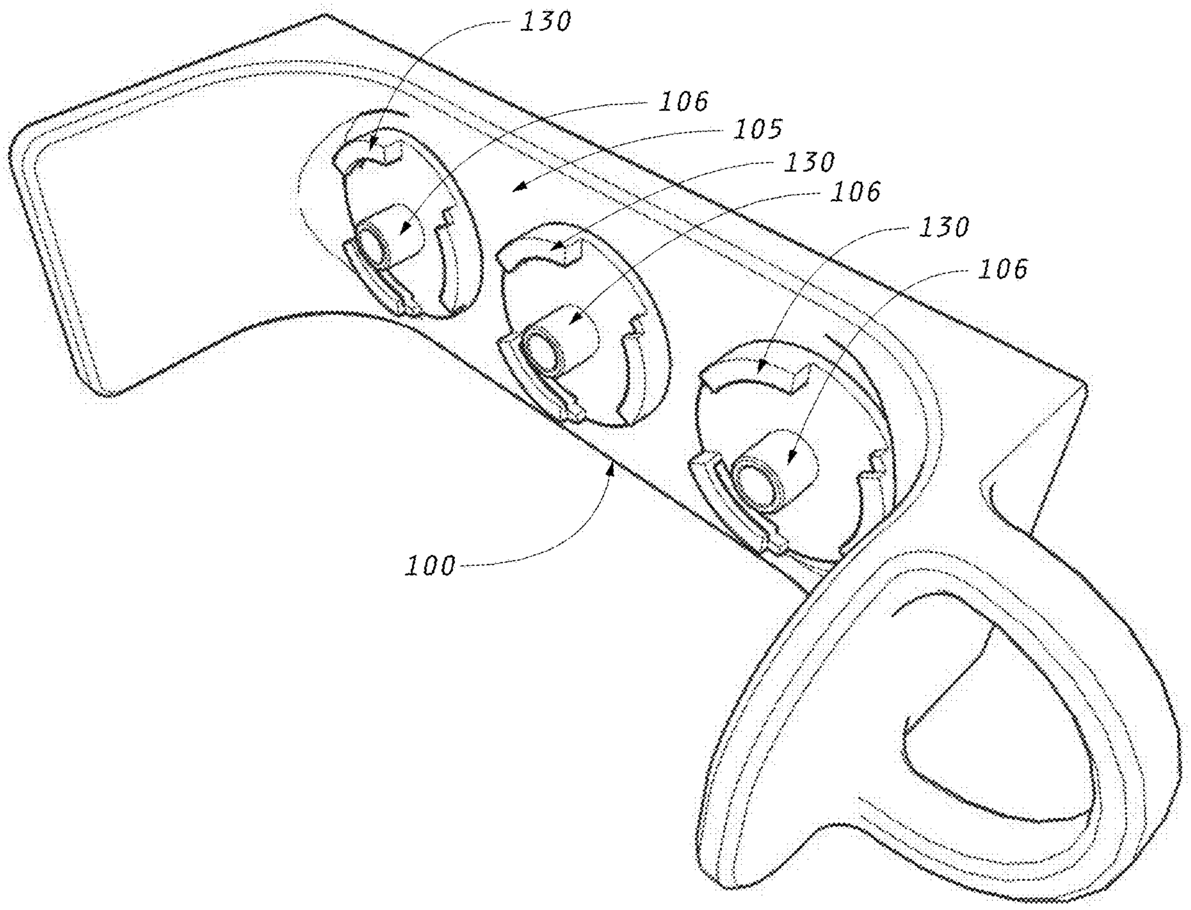
FIG. 11 is yet another perspective view of the device shown in FIG. 8.
Figure 12:
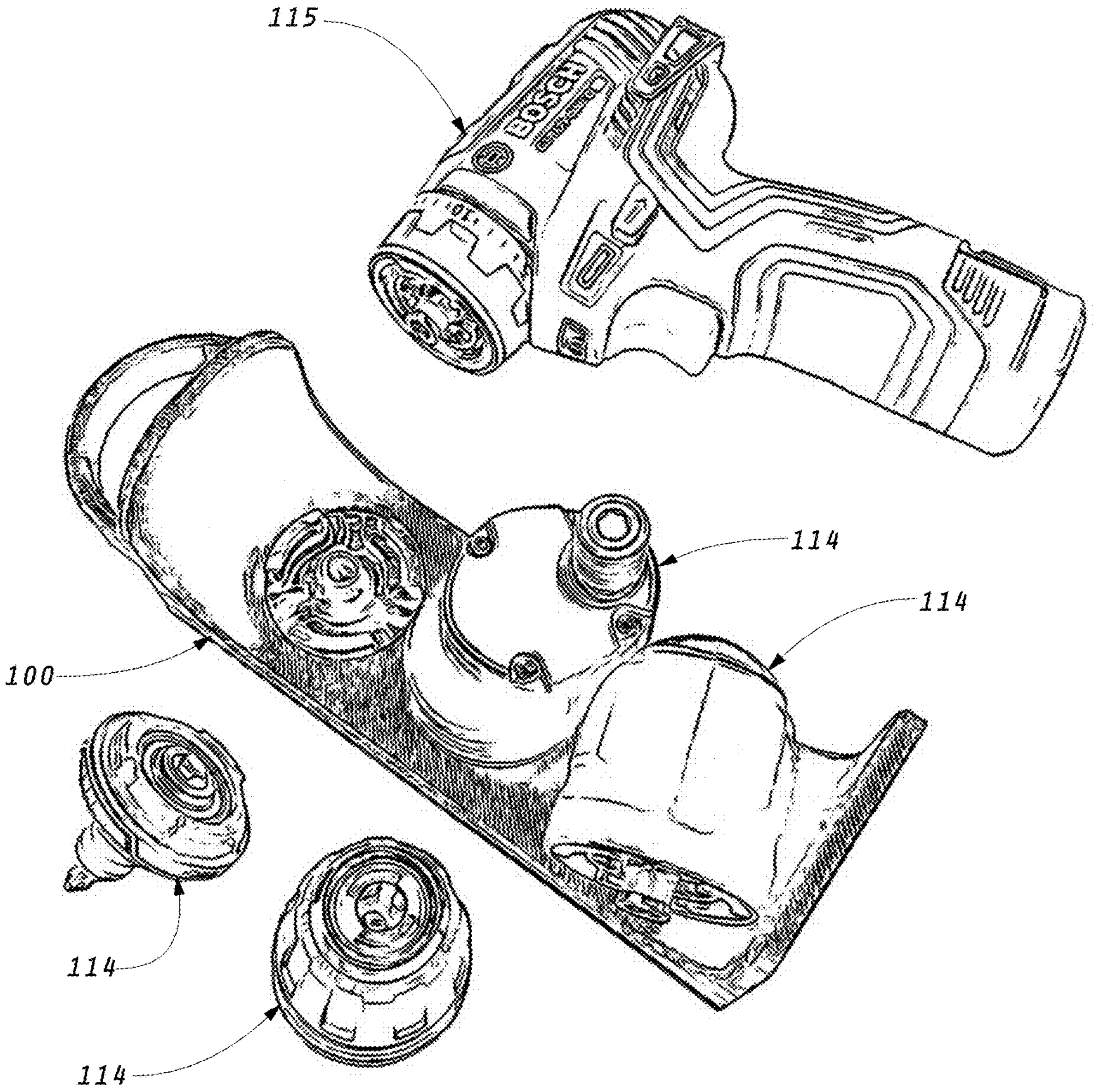
FIG. 12 is a perspective view of a drill and the device shown in FIG. 8 holding tools.

As shown in FIG. 9, each guard 130 can optionally have an arcuate or arch shape. In one optional embodiment, three spaced-apart guards 130 can form at least a portion of a circle around the cylindrical projection of the mounting point 106. Further, each guard 130 can optionally include a step or raised portion, such that a portion or projection of each guard 130 can be smaller or lower than a remaining portion of each guard 130. Such a configuration can facilitate attachment of particular tools 114, such as but not limited to BOSCH™ drill chucks, onto the mounting point(s) 106.

Optionally, the cylindrical projection and three spaced-apart guards 130 of each mounting point 106 can be formed as one integral unit having a circular outer periphery. The integral unit can optionally be removably attached to the base plate 105 to allow for easily replacing the mounting point 106 or to attached a mounting point of a different tool.

Figure 13:
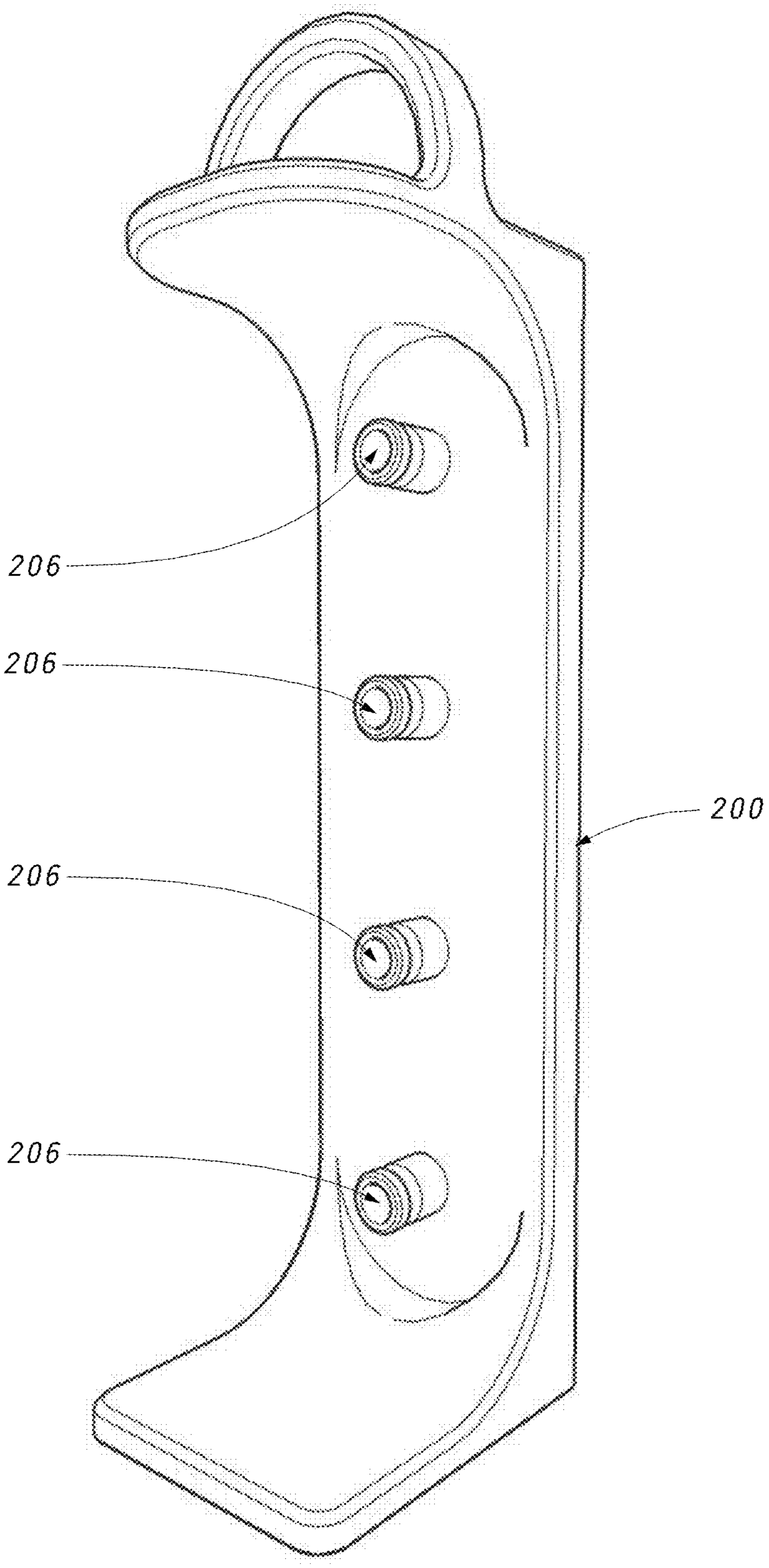
FIG. 13 is a perspective view of a device according to yet another embodiment of the presently disclosed technology.

FIG. 13 shows another embodiment of the handheld device, generally designated 200, of the presently disclosed technology. Similar or identical structure as between the embodiment of FIGS. 1-7 and the embodiment of FIG. 13 is distinguished in FIG. 13 by a reference number with a magnitude two hundred (200) greater than that of FIGS. 1-7. Description of certain similarities between the embodiment of FIGS. 1-7 and the embodiment of FIG. 13 may be omitted herein for convenience and brevity only.

One distinction of the embodiment of FIG. 13 is that the device 200 includes four spaced-apart mounting points 206. Thus, the device 200 can simultaneously support, carry, and/or organize four separate or distinct tools. Of course, fewer (e.g., one or two) or more (five) mounting points could be used.

The following exemplary embodiments further describe optional aspects of the presently disclosed technology and are part of this Detailed Description. These exemplary embodiments are set forth in a format substantially akin to claims (each set including a numerical designation followed by a letter (e.g., "A," "B," etc.), although they are not technically claims of the present application. The following exemplary embodiments refer to each other in dependent relationships as "embodiments" instead of "claims."

1A. A method of organizing, protecting, and/or carrying two or more drill chucks comprises:

removing one of the drill chucks from engagement with one of two or more mounting points of a device, each mounting point including a cylindrical projection configured to be inserted into a portion of at least one of the drill chucks; and attaching the one of the drill chucks to the one of the two or more mounting points by aligning a receptacle of the one of the drill chucks with one of the cylindrical projections and moving the one of the drill chucks toward a front surface of the device until the one of the cylindrical projections is sufficiently inserted into the receptacle for the one of the two or more mounting points to support the weight of the one of the drill chucks.

2A. The method of embodiment 1A, further comprising:

lifting the device by an arcuate handle that is attached to a body of the device at two spaced-apart points.

3A. The method of embodiment 1A or 2A, further comprising:

lowering the device onto a flat surface such that the device is in at least one of a vertical configuration, a side configuration, and a back configuration.

1B. A system for organizing, protecting, or carrying two or more drill chucks comprises:

a device having two or more spaced-apart mounting points, each mounting point being a cylindrical projection configured to be inserted into a portion of one or more of the drill chucks, an arcuate handle extending outwardly from a body of the device and being attached to the body at two spaced-apart locations, device being configured to lay stable on a flat surface in a vertical configuration, a side configuration, and a back configuration.

2B. The system of embodiment 1B, wherein the device if formed of metal and each cylindrical projection is welded to the body of the device.

3B. The system of embodiment 1B or 2B, wherein the device is a first device, and wherein a second device is placed back-to-back to the first device.

While the presently disclosed technology has been described in detail and with reference to specific examples thereof, it will be apparent to one skilled in the art that various changes and modifications can be made therein without departing from the spirit and scope thereof. It is understood, therefore, that the presently disclosed technology is not limited to the particular embodiments disclosed, but it is intended to cover modifications within the spirit and scope of the presently disclosed technology as defined by the appended claims.

I claim:

1. A handheld device configured to transport, organize, or store two or more tools simultaneously, the handheld device comprising:

a back plate having a planar rear surface an opposing front surface, and opposing side edges;

a top wall extending outwardly from a first end of the back plate in a first direction, the top wall having an interior surface and an opposing exterior surface;

a bottom wall extending outwardly from a second end of the back plate in the first direction;

a handle extending outwardly from the exterior surface of the top wall in a second direction, the second direction being perpendicular to the first direction, the handle including or defining an opening extending therethrough, the opening being oriented such that an object can pass through the opening in the first direction; and at least two spaced-apart mounting points each extending outwardly from the front surface of the back plate in the first direction, each mounting point being equidistantly spaced-apart from the opposing side edges of the back plate, each mounting point being positioned between the top and bottom walls, each mounting point being configured to be inserted into a receptacle of at least one of the two or more tools to attach the two or more tools to the handheld device.

2. The handheld device of claim 1, wherein the handheld device is configured to lay stable on a flat surface in a vertical configuration, a side configuration, and a back configuration without the tools inadvertently disengaging from the respective mounting point.

3. The handheld device of claim 1, wherein the two spaced-apart mounting points includes at least three spaced-apart mounting points that extend in a linear manner along the front surface of the back plate, the at least three spaced-apart mounting points being sufficiently spaced-apart so that each mounting point is configured to attach to one of the two or more tools without the two or more tools contacting each other.

4. The handheld device of claim 1, further comprising a first gusset located between the front surface of the back plate and the interior surface of the top wall, the first gusset including a curved wall configured to strengthen the handheld device.

5. A handheld device configured to transport, organize, or store two or more tools simultaneously, the handheld device comprising:

a back plate having a planar rear surface and an opposing front surface;

a top wall extending outwardly from a first end of the back plate in a first direction, the top wall having an interior surface and an opposing exterior surface;

a bottom wall extending outwardly from a second end of the back plate in the first direction;

a handle extending outwardly from the exterior surface of the top wall in a second direction, the second direction being perpendicular to the first direction;

at least two spaced-apart mounting points each extending outwardly from the front surface of the back plate in the first direction, each mounting point being positioned between the top and bottom walls, each mounting point being configured to be inserted into a receptacle of at least one of the two or more tools to attach the two or more tools to the handheld device; and a first gusset located between the front surface of the back plate and the interior surface of the top wall, the first gusset including a curved wall configured to strengthen the handheld device, wherein the first gusset includes a first recess therein, the first recess is configured to allow the at least one of the two or more tools to be positioned closer to the top wall when the at least one tool of the two or more tools is attached to a top one of the mounting points.

6. The handheld device of claim 5, further comprising a second gusset located between the front surface of the back plate and an interior surface of the bottom wall, the second gusset including a curved wall configured to strengthen the handheld device.

7. The handheld device of claim 6, wherein the second gusset includes a second recess therein, the second recess being configured to allow another one of the two or more tools to be positioned closer to the bottom wall when the another one of the two or more tools is attached to a bottom one of the mounting points.

8. The handheld device of claim 1, wherein the handle has an arcuate shape with opposing ends attached to the exterior surface of the top wall.

9. The handheld device of claim 1, wherein each of the two or more tools is a drill chuck configured to be removably attachable to a drill, wherein each drill chuck has a different shape.

10. The handheld device of claim 1, wherein each mounting point includes a cylindrical projection having an opening at a free end thereof that leads to a passageway within the projection.

11. The handheld device of claim 10, wherein a continuous groove extends around an entire periphery of the cylindrical projection, the groove being spaced-apart inwardly from the free end toward the front surface of the back plate, wherein the groove is positioned between the free end and the front surface of the back plate.

12. The handheld device of claim 11, wherein each mounting point further includes at least two guards spaced-apart from the cylindrical projection, each guard extending outwardly from the front surface of the back plate in the first direction, each guard being configured to engage a portion of the at least one of the two or more tools when the at least one of the two or more tools is attached to the handheld device.

13. The handheld device of claim 1, wherein a fastener removably attaches each mounting point to the back plate.

14. A combination comprising:

a power drill;

three tools removably attachable to the power drill, each of the three tools being a drill chuck, each drill chuck having a different shape; and a handheld device configured to transport, organize, or store each of the three tools simultaneously, the handheld device comprising:

a back plate having a planar rear surface and an opposing front surface;

a top wall extending outwardly from a first end of the back plate in a first direction, the top wall having an interior surface and an opposing exterior surface;

a bottom wall extending outwardly from a second end of the back plate in the first direction;

a handle extending outwardly from the exterior surface of the top wall in a second direction, the second direction being perpendicular to the first direction; and three spaced-apart mounting points each extending outwardly from the front surface of the back plate in the first direction, each mounting point being positioned between the top and bottom walls, each mounting point being configured to be inserted into a receptacle of at least one of the three tools to attach the three tools to the handheld device, wherein each drill chuck is removably attachable to one of the mounting points without first requiring removal of a portion of the handheld device.

15. The combination of claim 14, wherein the handheld device is configured to lay stable on a flat surface in a vertical configuration, a side configuration, and a back configuration, and wherein the handle has an arcuate shape with opposing ends attached to the exterior surface of the top wall.

16. The combination of claim 15, wherein the handheld device further comprises a first gusset located between the front surface of the back plate and the interior surface of the top wall and a second gusset located between the front surface of the back plate and an interior surface of the bottom wall, the first gusset including a curved wall configured to strengthen the handheld device and the second gusset including a curved wall configured to strengthen the handheld device.

17. The combination of claim 14, wherein each mounting point includes a cylindrical projection having an opening at a free end thereof that leads to a passageway of the projection.

18. The combination of claim 17, wherein a continuous groove extends around an entire periphery of the cylindrical projection, the groove being spaced-apart inwardly from the free end toward the front surface of the back plate, wherein the groove is positioned between the free end and the front surface of the back plate.

19. The combination of claim 17, wherein each mounting point further includes at least two guards spaced-apart from the cylindrical projection, each guard extending outwardly from the front surface in the first direction, each guard being configured to engage a portion of the at least one of the three tools when the at least one of the three tools is attached to the handheld device.

20. The combination of claim 14, wherein each mounting point is removably attachable to the back plate.

* * * * *